US007230728B2

(12) United States Patent
Su et al.

(10) Patent No.: US 7,230,728 B2
(45) Date of Patent: Jun. 12, 2007

(54) DISC IMBALANCE COMPENSATION DURING DISC DRIVE ASSEMBLY

(75) Inventors: Guo Chun Su, Singapore (SG); Ming Hui Chen, Singapore (SG); Hwa Liang Ng, Singapore (SG); Terence CheeKwong Cheng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 498 days.

(21) Appl. No.: 10/624,231

(22) Filed: Jul. 22, 2003

(65) Prior Publication Data

US 2005/0018338 A1    Jan. 27, 2005

(51) Int. Cl.
*G01B 11/14* (2006.01)

(52) U.S. Cl. .................................... 356/625
(58) Field of Classification Search ............ None
See application file for complete search history.

(56) References Cited

U.S. PATENT DOCUMENTS

| | | | |
|---|---|---|---|
| 3,663,795 A | 5/1972 | Myer | |
| 3,938,394 A | 2/1976 | Morrow et al. | |
| 4,683,505 A | 7/1987 | Schmidt et al. | |
| 4,784,012 A | 11/1988 | Marra | |
| 5,267,140 A | 11/1993 | Ibe | |
| 5,396,436 A | 3/1995 | Parker et al. | |
| 5,537,272 A | 7/1996 | Kazmierczak et al. | |
| 5,621,588 A | 4/1997 | Williams et al. | |
| 5,811,678 A | 9/1998 | Hirano | |
| 5,824,898 A | 10/1998 | Brooks et al. | |
| 6,101,876 A | 8/2000 | Brooks et al. | |
| 6,105,240 A * | 8/2000 | Chuang et al. | ............... 29/729 |
| 6,977,791 B2 * | 12/2005 | Zhu et al. | ..................... 360/75 |

* cited by examiner

*Primary Examiner*—Tu T. Nguyen
(74) *Attorney, Agent, or Firm*—Fellers, Snider, et al.

(57) ABSTRACT

A method and system is provided for compensating for imbalance in a data storage disc stack during assembly of the data storage device. An optical measurement system downstream of the disc clamp installation operation measures one or more parameters of a predetermined sample of disc-stacks produced on the assembly line A moving average of the sampled measurements is utilized to determine a component configuration type that will compensate for any measured disc stack imbalance.

20 Claims, 7 Drawing Sheets

DISC IMBALANCE COMPENSATION DURING DISC DRIVE ASSEMBLY

FIELD OF THE INVENTION

This application relates generally to data storage disc drive manufacturing and assembly and more particularly to real time compensation for data storage disc drive imbalance.

BACKGROUND OF THE INVENTION

The static imbalance of data storage disc stack assemblies, usually expressed in milligram-centimetres ("mg-cm"), has recently become a critical performance parameter in disc drive design. This is primarily due to the increasing demand for precision performance in the consumer data storage product market. High imbalance of the disc stack may lead to structural vibration and undesirable noise, both of which are unacceptable in consumer products such as games-boxes and audio-video products. Furthermore, the industry standard specification for drive level imbalance has been reduced from an industry standard, 70 mg-cm to the current state of the art, 50 mg-cm.

The major contributors to the disc stack imbalance of a typical disc drive include disc clamp offset, clamp mass, clamp notch size, motor "MR", and media "MR", where MR is a function of the mass (M) of the media or motor in (mg) x the offset (R) of the media or motor in (cm) from the center of gravity (CG). Of these major contributors, research has shown that the most sensitive contributors that could impact process yield are the clamp offset and the angular orientation or direction of the clamp offset. Clamp offset is defined as the radial distance between the center of the clamp and the center of the spindle motor to which the clamp is attached.

The disc stack typically includes one or more data storage discs clamped onto a motor hub flange via a stamped metallic clamp. The clamp design may also include a spring expansion ring to self-center the clamp with respect to the motor axial centerline. The condition of the machine that is used to assemble the disc clamp onto the stack, the centering of the ring, as well as the clamp shape are all factors that can contribute to the overall stack imbalance. With an industry standard of 50 mg-cm for static imbalance, and with the incoming drive components being at optimum condition, current processes for the assembly of disc drives still have poor process capability. Some of the processes generate 2–9% of their disc drives at a static imbalance higher than the 50 mg-cm standard. These imbalances are often compensated for by adding weights or screws to the motor hub or by physically offsetting the data storage discs on the motor hub flange.

Research has shown that the disc clamp offset and the clamp offset angle are two of the most important factors contributing to static imbalance. However, corrective actions typically involve major design changes and added cost such as active balancing which requires a design change and the addition of counter-balance weights. These solutions also require extra manufacturing floor space and labor to perform the corrective balancing.

Accordingly there is a need to develop a way of compensating for the disc clamp offset without a major design change or extensive costs. The embodiments of the present invention provide a solution to this and other problems, and offers other advantages over the prior art

SUMMARY OF THE INVENTION

Against this backdrop embodiments of the present invention have been developed. In some embodiments a method is provided of compensating for imbalance in data storage disc stack processing during assembly of the data storage device. The method incorporates an optical measurement system downstream of the disc clamp installation operation. The introduction of a real-time optical measurement system into the assembly line has numerous strategic advantages. The system measures multiple parameters of a most recent set N of incoming disc-stacks produced on the assembly line, where N is a suitable sample size, such as 30 disc stacks. The measured parameters include disc clamp offset, clamp offset angle, ring outer diameter, ring offset, and ring offset angle, where the disc clamp may be installed with a spring expansion ring designed to center the clamp with respect to the axial centerline of the drive motor. The optical capabilities of the system provide quantitative measurement of the install conditions for the clamp and other components, which permits optimization of the components and machine settings. For instance, the optical system may inspect the ring closure condition to avoid reliability issues due to slippage of the disc media.

After measuring parameters for a suitable sample size N, the optical system calculates a dynamic or moving average of the most recent set of N disc stack component offsets and offset angles. The component offsets represent the offsets of the disc stack components from a central point of the disc stack, such as the axial center of the drive motor, and the offset angles represent the direction of the offsets measured from a zero reference mark. The calculated averages are then utilized to determine a component configuration type that will compensate for the imbalance in the next disc stack based on the averages of the most recent N component offsets and offset angles. For instance, in the case of a disc clamp component, compensating notches cut in the perimeter of the disc clamp are enlarged or added at certain angles on the clamp depending on the average clamp offset and the average clamp offset angle, thus providing multiple clamp configuration types. The optical measurement system determines the optimum clamp configuration type to use on each next installation. The system then feeds back the clamp configuration type to a clamp installation station in the assembly line operation.

During assembly of the next disc stack, the clamp installation station receives and installs the clamp configuration type that compensates for imbalance in that disc stack according to the offset trend. The clamp offset and clamp offset angle of this next assembled disc stack are then measured for use in the next moving average calculation for the most recent N disc stacks produced on the assembly line. This process results in a significantly better balancing process capability and improved product quality throughput. The optical measurement system also recognizes supplier codes printed on the components and can track assembly data such that the calculated averages may be correlated with the machine that installed the clamp and the supplier of the clamp: This enables optimization and comparison of installation equipment settings and component parts.

The above techniques of using optical measurement feedback to selectively install predetermined clamp configuration types to counter balance the disc stack imbalance during disc drive assembly has proven to be effective and feasible. The concept could be extended to the measurement of media and non-symmetrical component offsets with respect to the motor's center axis for achieving further drive balance improvement. These and various other features as well as advantages which characterize embodiments of the present invention will be apparent frail a reading of the following detailed description and a review of the associated drawings.

DETAILED DESCRIPTION

Figure 1:
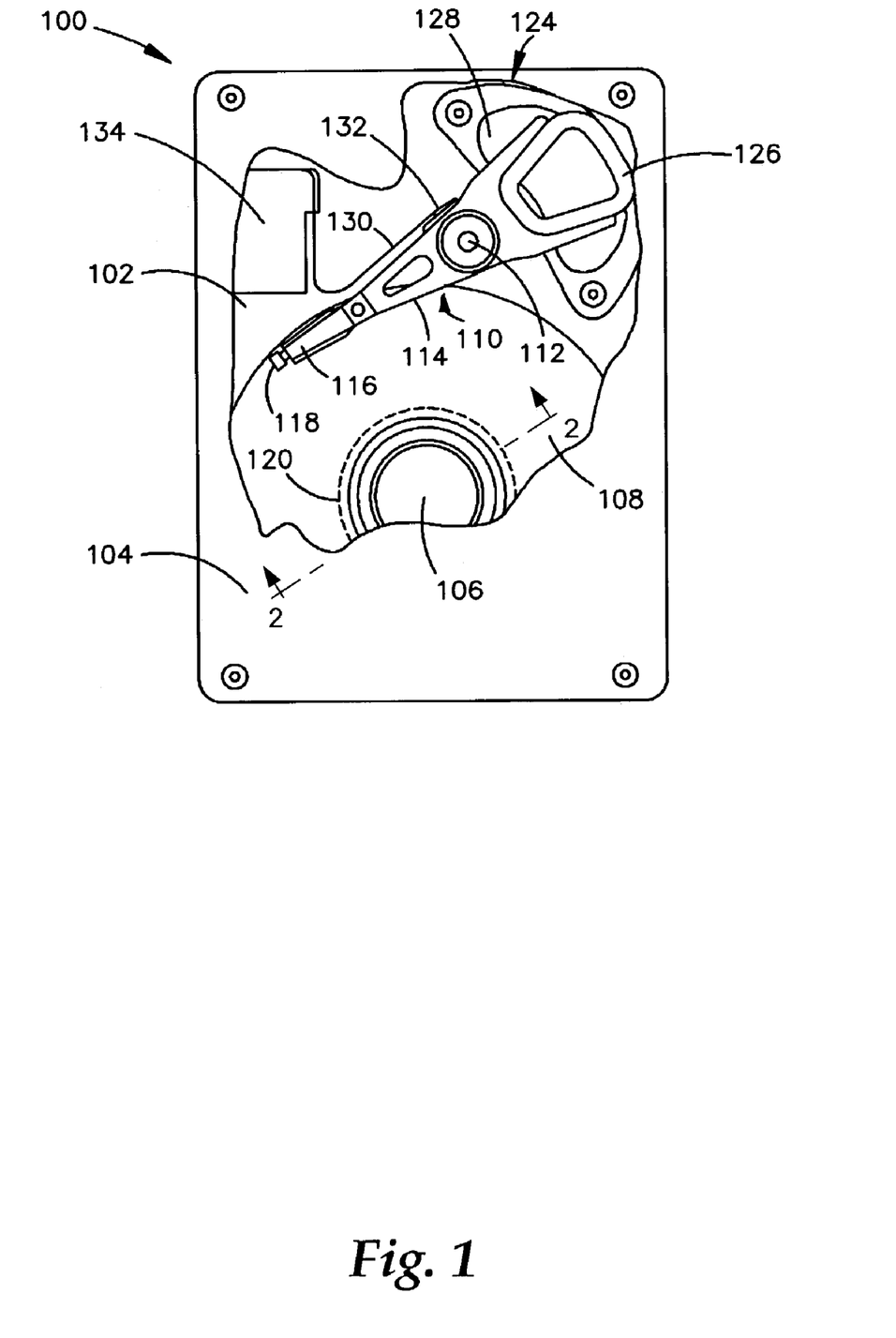
FIG. 1 is a plan view of a disc drive assembled in accordance with embodiments of the present invention showing the primary internal components.

A disc drive 100 constructed in accordance with embodiments of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a fluid bearing slider enabling the head 118 to fly in close proximity adjacent the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
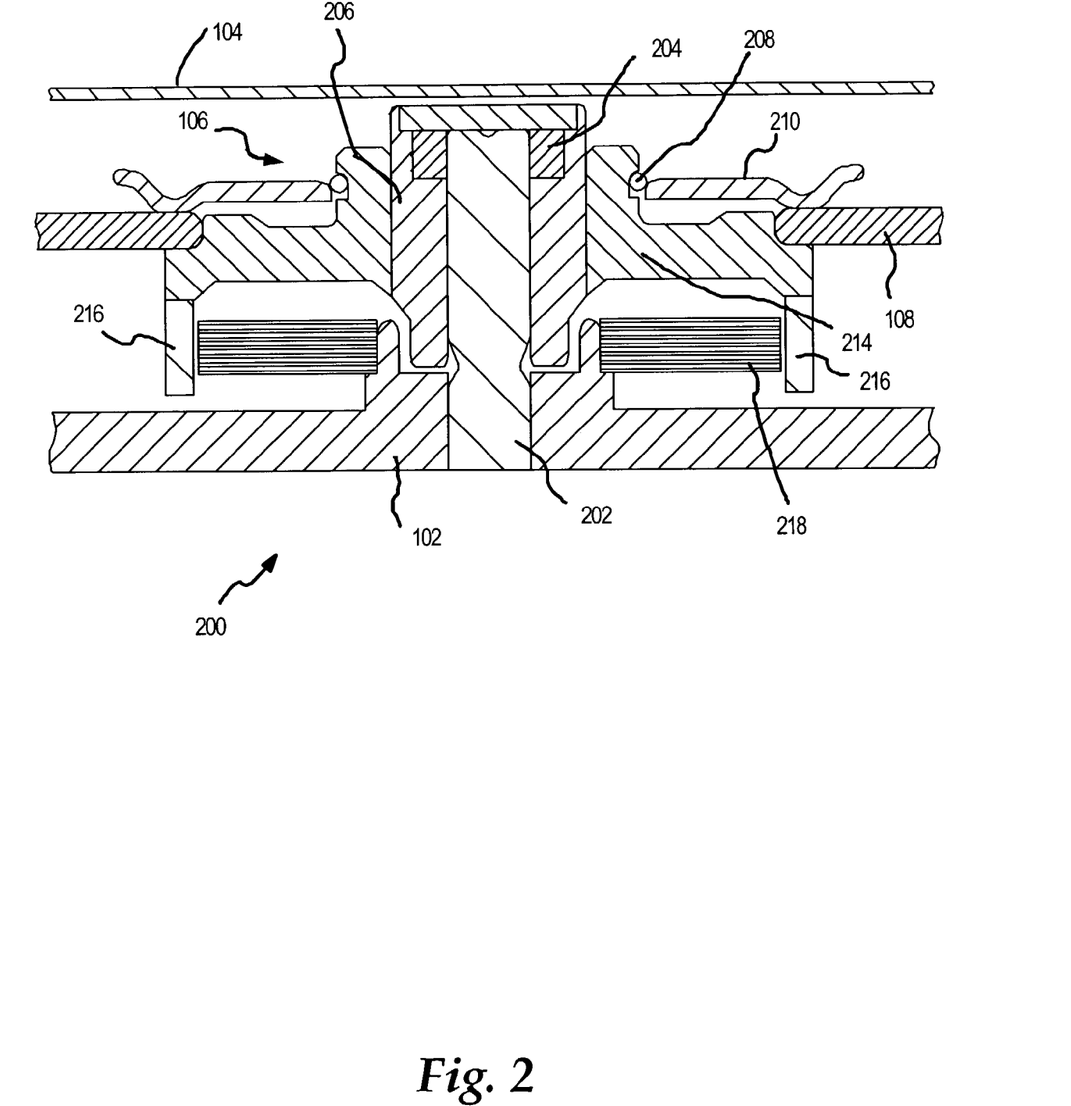
FIG. 2 is a cross sectional view through the disc drive in FIG. 1 taken along line 2—2.

FIG. 2 shows a cross sectional view of a disc stack assembly 200 within the disc drive 100 in accordance with embodiments of the present invention. The disc stack assembly includes the spindle motor 106, the discs 108, a disc clamp 210 that secures the discs 108 to the spindle motor 106, and a spring expansion ring 208 designed to self-center the disc clamp 210 with respect to the axial centerline of the spindle motor 106. The components of the spindle motor 106 include a disc support flange 214 that is press fit onto a rotating hub 206 and supports the discs 108. The rotating hub 206 is mounted via a bearing 204 to a stationery spindle 202, which is press fit into the base plate 102 of the drive 100. Stator coils 218 are spaced laterally from the bottom of the rotating hub 206 and permanent magnets 216 are attached and extended from the bottom of the disc support flange 214 just outboard the stator coils 218. The application of current to the stator coils 218 causes magnetic interaction between the permanent magnets 216 and the stator coils 218 such that the hub 206 rotates about the stationary spindle 202 carrying the discs 108 via the flange 214.

Two of the major contributors to the imbalance of the disc stack assembly is the offset of the clamp 210 center from the axial center of the spindle motor 106 and the direction or angle of this offset. The basic idea behind compensating for imbalance in a disc stack assembly during assembly of the disc drive 100, is to measure clamp offsets and offset angles for a sample of size N, of the most recent assembled disc stacks, and calculate a moving average of both offset and angle parameters to determine a clamp 214 configuration type (e.g. I, II, III) that will compensate for the moving average offsets and offset angles. The clamp configuration type is then fed back in real time to select and install the selected clamp configuration type on the next disc drive 100 best suited to balance the disc stack 200 in accordance with the offset trend. Additional details with regard to the clamp offset, the clamp offset angle, and the compensating clamp configuration type will be described below with respect to FIGS. 3–7.

Figure 3:
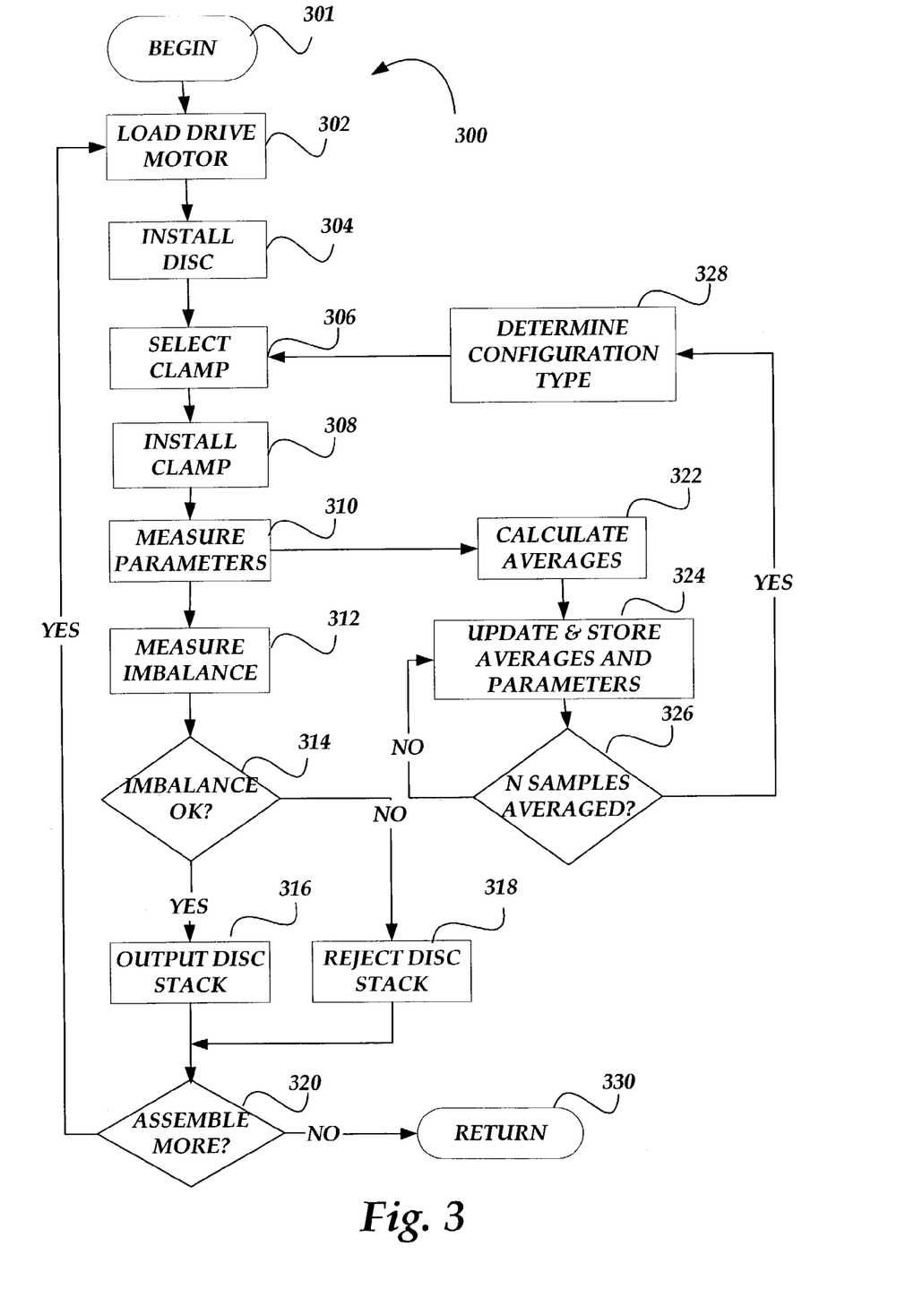
FIG. 3 is an operational flow diagram of an assembly process in accordance with a embodiments of the present invention.

FIG. 3 shows an operational flow diagram of a disc drive assembly process 300 that compensates for disc stack imbalance in accordance with embodiments of the present invention. Process 300 starts with "BEGIN operation 301. Control is then passed to operation 302.

Operation 302 loads the drive spindle motor 106, including the hub 206 and the flange 214, onto the base plate 102. Then the base plate 102, with the drive motor 106 installed, is loaded onto an assembly line. Control then passes to operation 304 where discs 108 are installed onto the spindle motor 106. Control then passes from operation 304 to operation 306.

Operation 306 selects the clamp configuration type 210 to be installed on the disc stack 200. The operation 306 may receive a predetermined or selected clamp configuration type to be installed from operation 328 once N samples have been measured and averaged in operations 310 and 322 respectively. Next, control passes from operation 306 to operation 308 where the selected clamp configuration type is installed onto the disc stack 200. The clamp 210 is secured with the spring expansion ring 208 during operation 308. The base plate 102 with the disc stack 200 installed then enters the optical measurement system and control passes to operation 310.

Operation 310 measures multiple parameters of the disc stack 200 including disc clamp 210 offset, clamp offset angle, ring 208 diameter, ring offset, ring offset angle, and clamp 210 angle. Measurements are optically taken with a digital camera and are transmitted to operation 322 for average calculations as the disc stack 200 continues on to operation 312.

Operation 322 receives the measurements and calculates a moving or dynamic average for the most recent number of clamp offsets and offset angles that have been measured and transmitted from operation 310. Control then passes from operation 322 to operation 324 where the calculated averages are updated and stored. Control then passes to determination operation 326.

Determination operation 326 ascertains whether the most recent N samples have been averaged, where N is a suitable sample size such as 30. If the most recent N samples have not been averaged yet, control branches "NO" back to operation 324. If the most recent N samples have been averaged, control branches "YES" where operation 328 assumes control.

From the N averaged clamp offsets and offset angles, operation 328 determines the clamp configuration type best suited to improve stack imbalance on the next assembled disc stack 200. Operation 328 then feeds back the clamp configuration type to operation 306 for use in selecting the clamp configuration type for installation on the next assembled disc stack 200.

Meanwhile at operation 312, the stack imbalance of the disc stack 200 advancing from operation 310 is measured. Control then passes to determination operation 314. Determination operation 314 ascertains whether the disc stack 200 imbalance, measured in mg-cm, exceeds a predetermined threshold value. If the imbalance is greater than the threshold value, control branches "NO" and is transferred to operation 318. Operation 318 rejects the disc stack 200 and marks the disc stack 200 such that it is no longer processed. Control then passes to determination operation 320.

If the imbalance is less than or equal to the predetermined threshold value, control branches "YES" and is transferred to operation 316, where the disc stack 200 is advanced for output and additional processing. Control then passes to determination operation 320.

Determination operation 320 ascertains whether there are more disc stacks 200 to be assembled. If there are not more disc stacks 200 to be assembled, control branches "NO" to operation 330 where control is returned to other routines at operation 330. If there are more disc stacks 200 to be assembled, control branches "YES" to operation 302 where a next disc stack begins assembly.

Figure 4:
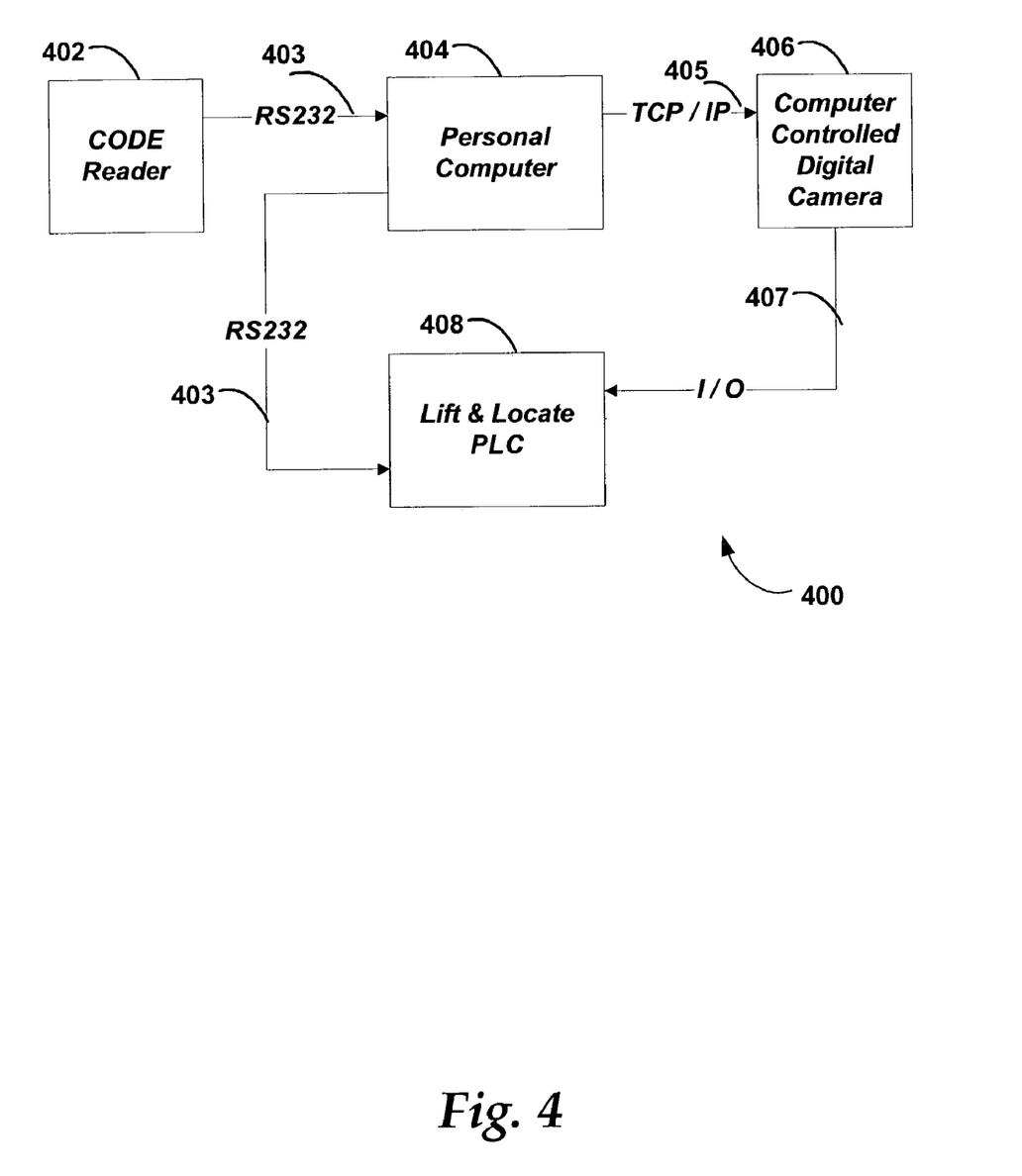
FIG. 4 is a model schematic of an optical measurement system for determining and feeding back clamp configurations that compensate for disc stack imbalance in accordance with embodiments of the present invention.

FIG. 4 shows a model schematic of an optical measurement system for determining and feeding back clamp configuration types that compensate for disc stack imbalance in accordance with embodiments of the present invention. Components of the optical measurement system 400 include a code reader 402 for detecting when a disc stack 200 arrives at the optical measurement work zone and for reading the barcode tags attached to the base of the drive motor 106 for each disc stack 200. The bar codes identify the serial number and the machine or assembly line install number for each disc stack 200. Based on the serial number, and through a network database, a computer 404 of the optical measurement system 400 is notified as to whether the disc stack 200 has had a failure at any of the work zones upstream on the assembly line before arriving at measurement system 400. The bar code will also reference process information through the network database such as information regarding what supplier provided the clamp 210, drive base 203 or motor 106. If the disc stack has experienced a failure at a prior work zone or if any of the required process information is not valid or in place, the disc stack will be bypassed through the optical measurement system 400 and no further processing will occur. The code reader 402 is interconnected with the computer 404 through a standard interface 403.

The computer 404 controls the entire optical measurement system and receives inputs from and transmits outputs to a computer controlled digital camera 406, through a transmission control protocol/internet protocol interface ("TCP/IP") 405, and a lift and locate programmable logic controller ("PLC") 408 through a standard interface 403. The PLC 408 controls automation hardware that lifts and locates the disc stack 200 in a position for the digital camera 406 to capture an image of the clamp configuration and offsets. The digital camera 406 is equipped with a back lighting feature to handle reflective clamp surfaces and is interfaced with the PLC 408 through a standard input/output interface 407. The optical capabilities of the camera 406 also recognize supplier codes printed on components and enable correlation between the measurements and the component suppliers.

Figure 5:
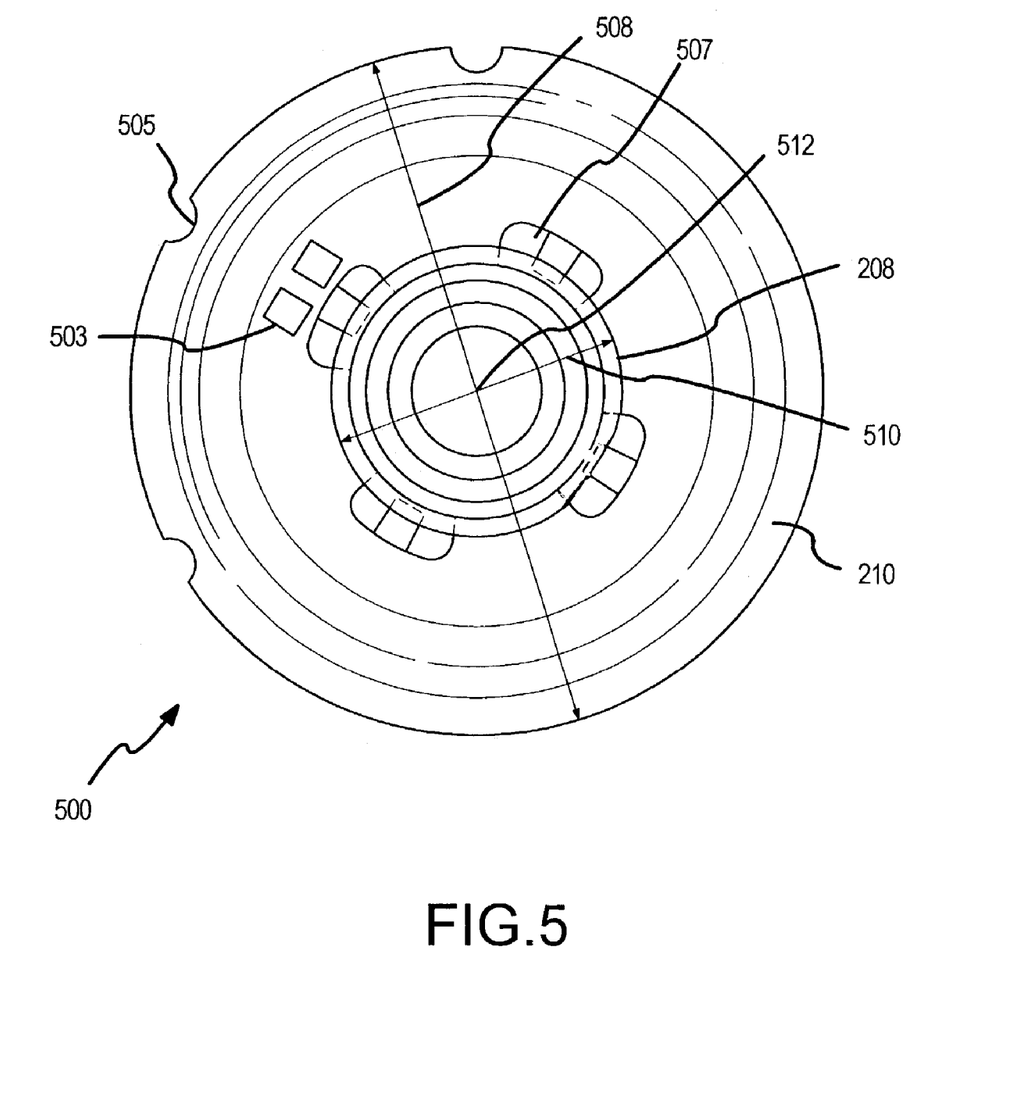
FIG. 5 is a plan view of a disc clamp and a spring expansion ring configuration, illustrating measurements utilized in an absolute calibration of an optical measurement system in accordance with embodiments of the present invention.

FIG. 5 shows a plan view of a disc clamp 210 and a spring expansion ring 208 configuration via an image capture 500, illustrating measurements utilized in an absolute calibration of the optical measurement system 400 in accordance with embodiments of the present invention. Image capture 500, captured by the digital camera 406, is utilized to calibrate the optical measurement system 400. Absolute calibration of the system 400 is conducted to ensure precise measurements during the measurement operation. A special marking on the clamp 210 defines the zero reference angular orientation 503. Subsequent angle measurements will be clock-wise from this zero reference marking 503. Compensating notch 505, located at the zero angle reference, is referred to as the center notch 505. The center notch 505 is usually located at the zero reference angle.

The offset angle is defined as the offset direction of the highest point of the clamp outer diameter 508. The clamp angle is defined as the orientation of the reference marking 503. The clamp diameter 508 as indicated above is used to calibrate the pixel count of the digital camera 406 down to, for instance, a resolution of 0.0002 inches. The clamp offset is defined as the radial offset of the center of clamp diameter 508 with respect to the axial spindle motor center or center of gravity 512. The ring diameter 510 is also captured in the image capture 500 at the four slot openings 507 and the average is taken for calibration. During calibration, apparent measured values of the parameters are compared to actual measured values and a scaling factor is utilized to convert the apparent values to the actual values.

Figure 6:
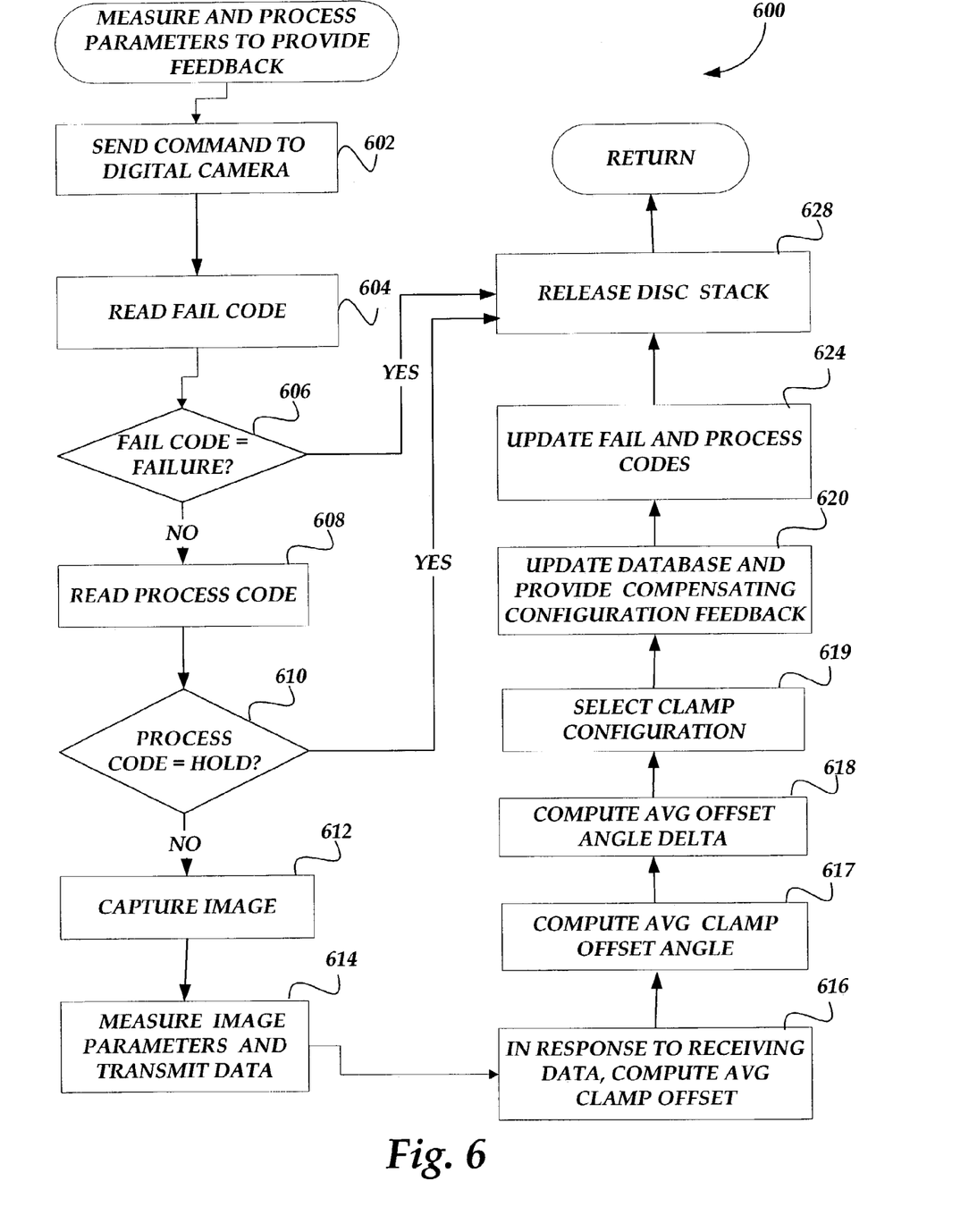
FIG. 6 is an operational flow diagram illustrating an optical measurement logic flow of an optical measurement system in accordance with embodiments of the present invention.

FIG. 6 is an operational flow diagram illustrating an optical measurement logic flow of an optical measurement system in accordance with embodiments of the present invention. The optical measurement operation 600 measures and computes disc stack parameters that are fed back to the clamp installation operation to identify a clamp configuration type that will compensate for the calculated parameters according to offset trends. The optical measurement and calculation operation, according to embodiments of the present invention, starts with operation 602.

In response to a disc stack 200 arriving at an optical measurement work zone or station, the computer 404 sends a command to the digital camera 406 to capture an image of the disc clamp 210 on the disc stack 200. Control then passes to operation 604.

Operation 604 reads a fail code associated with the serial number of the disc stack 200. Control then passes to determination operation 606.

Determination operation 606, ascertains whether the disc stack has failed at a previous work zone. If the disc stack 200 has failed at a previous work zone, control branches "YES" and the operation 628 assumes control. Operation 628 ends the optical measurement operation 600 and releases the current disc stack 200. If the disc stack 200 has not failed at previous or upstream work zones, control branches "NO" and operational control is transferred to operation 608.

Operation 608 reads a process code associated with the serial number of the disc stack 200. Control then passes to determination operation 610. Determination operation 610 ascertains as to whether a disc stack 200 has a process hold for any reason such as lack of a supplier or machine installation code. If the disc stack 200 has a process hold active, control branches "YES" and the operation 628 assumes control. Operation 628 ends the optical measurement operation 600 and releases the current disc stack 200. If all process indicators are active, control branches "NO" and operational control passes to operation 612.

Operation 612 captures an image of the disc clamp 210 installed on the disc stack 200 and checks for validity of the image. In response to a valid image being captured control passes to operation 614.

Operation 614 measures the following disc stack 200 parameters via the computer controlled digital camera 406: clamp angle, clamp offset, clamp angle offset or orientation, motor center point or center of gravity, ring offset, ring offset angle or orientation, ring diameter, ring concentricity with respect to the clamp 210, and motor shaft diameter. Operation 614 then transmits the measured parameters from the digital camera 406 to the computer 404. Control then passes to operation 616.

Operation 616 processes the measured parameters by calculating or computing a moving average for the clamp offset of the most recent N disc stacks produced on the assembly line or machine including the disc stack 200 currently in the work zone. The moving averages may be calculated for a certain clamp supplier or vendor code, install machine code, and ring concentricity. Operation 616 computes the dynamic moving average of the clamp offset C in mils with user defined parameters N, k, and i. The data series is smoothed by taking the average readings of the last N observations, starting from the observation at time period t. A moving average of order N at time period t is given by the equation (1):

$$C_t = \frac{1}{N} \sum_{j=t}^{t-(N-1)} c_j = \frac{1}{N}(c_t + c_{t-1} + \ldots + c_{t-(N-1)})$$

and where $C_{ki}$ represents a two dimensional matrix where "k" is the machine code and "i" is the clamp supplier code. Operational control then passes to operation 617.

Operation 617 computes the dynamic moving average of the clamp offset angle A in degrees with user defined parameters N, k, and i. The data series is smoothed by taking the average readings of the last N observations, starting from the observation at time period t. A moving average of order N at time period t is given by the equation (2):

$$A_t = \frac{1}{N} \sum_{j=t}^{t-(N-1)} a_j = \frac{1}{N}(a_t + a_{t-1} + \ldots + a_{t-(N-1)})$$

and where $A_{ki}$ represents a two dimensional matrix where "k" is the machine code and "i" is the clamp supplier code. Operational control then passes to operation 618.

Operation 618 computes the dynamic moving average of the clamp offset angle delta D in degrees with user defined parameters N, k, and i. The data series is smoothed by taking the average readings of the last N observations, starting from the observation at time period t. A moving average of order N at time period t is given by the equation (3):

$$D_t = \frac{1}{N} \sum_{j=t}^{t-(N-1)} d_j = \frac{1}{N} \sum_{j=t}^{t-(N-1)} \text{Absolute } (a_j - A_t)$$

$a_t - A_t$) ranges from +/−(0 to 180), if>180 use (360−($a_t-A_t$)) and where $D_{ki}$ represents a two dimensional matrix where "k" is the machine code and "i" is the clamp supplier code. Operational control then passes to operation 619.

Figure 7:
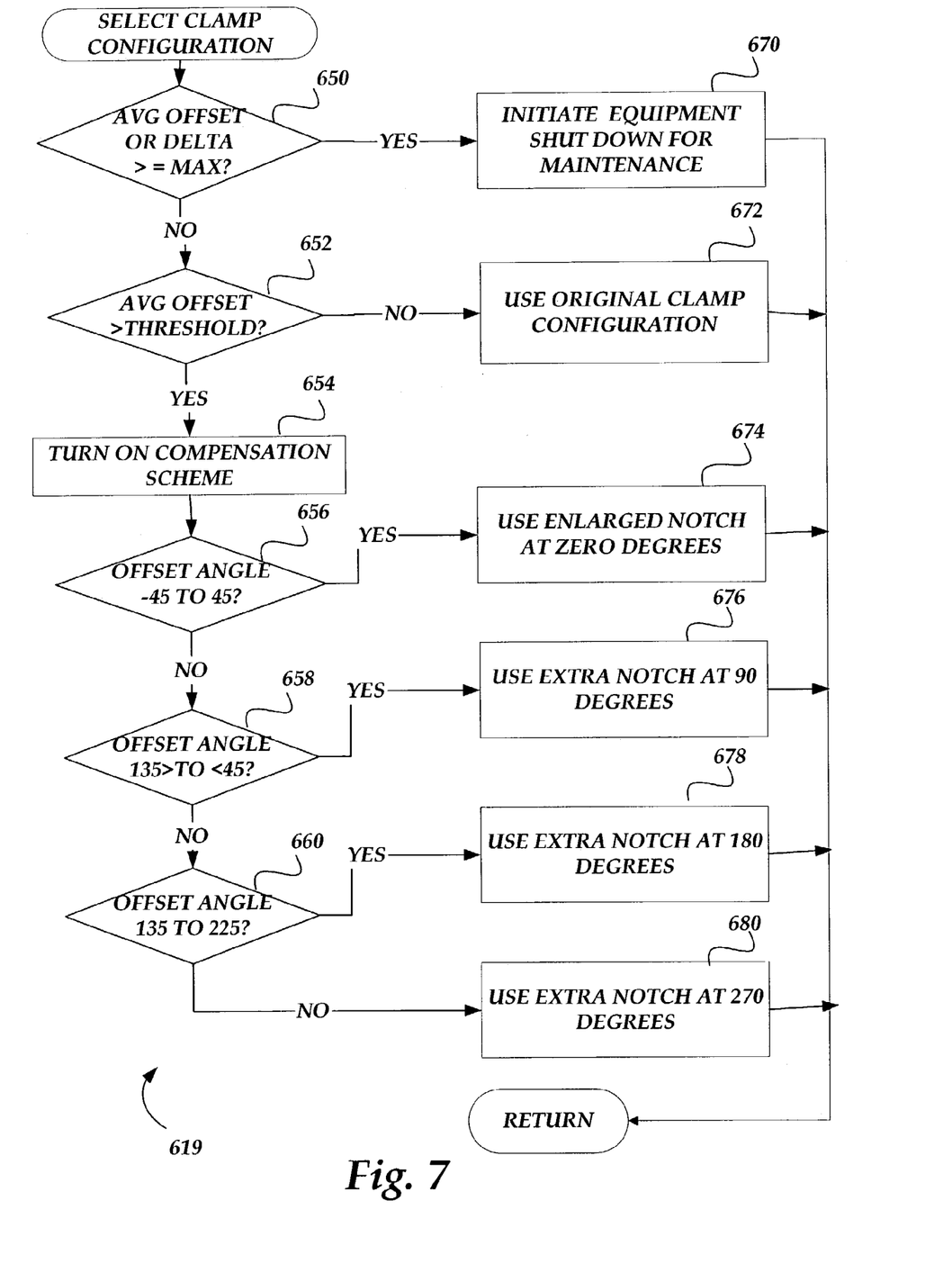
FIG. 7 is an operational flow diagram illustrating a clamp configuration type selection logic flow of an optical measurement system in accordance with a embodiments of the present invention.

Referring now to FIG. 7, operational flow 619 selects the optimum clamp configuration type for the next disc stack 200 based on the clamp offset and offset angle trends. Operational flow 619 begins with determination operation 650. Determination operation 650 ascertains whether the clamp offset angle delta D is greater than or equal to a predetermined maximum angle, or whether the average clamp offset C is greater than a predetermined maximum threshold offset, thus indicating a process experiencing greater-than-expected variation. If C is greater than the maximum threshold offset or if D is greater than or equal to the maximum threshold angle control branches "YES" to operation 670 where operations to shut down the machine for maintenance are initiated. If C is less than or equal to the maximum threshold offset and if D is less than the maximum threshold angle, control branches "NO" and operational control then passes to determination operation 652.

Determination operation 652 ascertains whether the average clamp offset C is greater than a predetermined threshold offset, representing a nominal center of gravity offset, before starting the compensation scheme. For instance, a disc clamp of mass 5000 mg with an average clamp offset of 0.0015 inches will produce an equivalent imbalance of 19 mg-cm, which is well below the industry standard maximum of 50 mg-cm. Thus a predetermined threshold clamp offset could be set at 0.0015 inches before the compensation scheme is turned on. If C is less than or equal to the predetermined threshold offset, control branches "NO" and the operation 672 assumes control. Operation 672 selects the original clamp configuration without modification because the clamp offset does not exceed the predetermined threshold offset. If C is greater than the predetermined threshold offset, control branches "YES" to operation 654.

Operation 654 turns on the compensation scheme because C is greater than the predetermined threshold offset and less than the maximum threshold offset. The compensation scheme determines the desired or optimum clamp configuration type necessary to compensate for imbalance in the next disc stack according to offset trends. The original clamp configuration is modified by enlarging existing notches or placing extra compensation notches in the perimeter or interior surface of the disc clamp 210 within the sector or quadrant of the clamp offset angle, measured clockwise ("CW") from the calibrated zero marking 503. Control then passes to determination operation 656 to identify the optimum clamp configuration type to compensate for the clamp offset trend.

Determination operation 656 ascertains whether the average offset angle A is within a first sector or quadrant, where the first sector is defined at or within the range of −45 degrees to 45 degrees measured from the zero marking 503. If A is within the first sector, control branches "YES" to operation 674.

Operation 674 selects the clamp configuration type where the center notch, located at the zero marking 503, is enlarged to compensate for the clamp offset. If A is outside of the first sector range, control branches "NO" to determination operation 658.

Determination operation 658 ascertains whether A is within a second sector or quadrant, where the second sector is defined within the range of greater than 45 degrees and less than 135 degrees. If A is within the second sector, control branches "YES" to operation 676.

Operation 676 selects the clamp configuration type where an extra compensation notch is placed at 90 degrees from the zero degree marking 503. If A is outside of the second sector range, control branches "NO" to determination operation 660.

Determination operation 660 ascertains whether A is within a third sector or quadrant, where the third sector is defined within the range of greater than or equal to 135 degrees and less than or equal to 225 degrees. If A is within the third sector, control branches "YES" to operation 678.

Operation 678 selects the clamp configuration type where an extra compensation notch is placed at 180 degrees from the zero degree marking 503. If A is outside of the third sector range, control branches "NO" to operation 680.

Operation 680 selects the clamp configuration type where an extra compensation notch is placed at 270 degrees from the zero degree marking 503. Referring back to FIG. 6A, control then passes to operation 620.

Operation 620 updates the database with the measured and calculated parameters and feeds back or transmits the selected clamp configuration type to the clamp installation operation upstream for use on the next disc stack 200. Control then passes to operation 624.

Operation 624 updates the fail and process codes based on the disc stack outcome in the optical measurement system 400. Control then passes to operation 628 where the disc stacks are released and control is returned to other operations.

In summary, the present embodiments can be viewed as a method (such as shown in operational flow 300) of compensating for imbalance in a data storage disc stack (such as 200) within a data storage device (such as 100) during assembly of the data storage device (such as 100), the disc stack (such as 200) having components including a drive motor (such as 106) having a stationary stator (such as 218) and a hub (such as 206) that rotates about a stationary spindle (such as 202), the hub (such as 206) having a disc support flange (such as 214) supporting one or more data storage discs (such as 108) secured to the flange by a disc clamp (such as 210).

The method (such as shown in operational flow 300) of the present embodiments can be viewed as comprising the acts of: optically measuring one or more disc stack parameters, including disc stack component offsets and disc stack component offset angles for a most recent N disc stacks (such as 200) produced on an assembly line; calculating a moving average of the most recent N disc stack component offsets and the most recent N offset angles; utilizing the calculated avenges to determine a desired component configuration type; and feeding back the desired component configuration type to a component installation station to select the desired component configuration type for installation in a next disc stack (such as 200)

The method (such as shown in operational flow 300) includes determining whether a next disc stack (such as 200) is to be assembled; in response to the next disc stack (such as 200) being assembled, receiving and installing the component configuration type to compensate for imbalance in the next disc stack (such as 200); and optically measuring, with the optical measuring system (such as 400), the disc stack parameters on the next disc stack (such as 200). Additionally, the preceding acts, from calculating a moving average of the most recent N disc stack component offsets and offset angles to optically measuring the disc stack parameters on the next disc stack (such as 200) may be repeated for each subsequent disc stack (such as 200).

Additionally, the method (such as shown in operational flow 300) can also be viewed as compensating for disc stack imbalance when a disc stack component comprises the disc clamp (such as 210) and the disk stack parameters comprise N clamp offsets and N clamp offset angles wherein the clamp offset comprises a radial distance between the axial centerline of the drive motor (such as 512) and the center of the disc clamp and the clamp offset angle comprises a clamp offset direction measured from a zero reference mark (such as 503) on the disc clamp (such as 210).

Furthermore, assembly of the next disc stack (such as 200) can be viewed as comprising: loading a next drive motor (such as 106) and motor base (such as 102) onto the assembly line and installing at least one data storage disc (such as 108) onto the disc support flange (such as 214) of the next drive motor hub (such as 206). Additionally, receiving and installing the component configuration type can be viewed as comprising: receiving, at a disc clamp installation station, a disc clamp configuration type to compensate for imbalance in the next disc stack (such as 200) and installing the disc clamp (such as 210) having the predetermined configuration type over the flange (such as 214) of the next disc stack (such as 200) to secure the at least one disc (such as 108).

Additionally, measuring one or more disc stack parameters on the next disc stack (such as 200) with the optical measuring system (such as 400) can be viewed as comprising measuring the clamp offset and the clamp offset angle of the next disc stack (such as 200) for use in a sample size N calculation for the average clamp offset and average angle. Furthermore, the clamp (such as 210) can be installed with a spring expansion ring (such as 208) that is designed to center the clamp (such as 210) with respect to the axial centerline of the drive motor (such as 512) and the measured disc stack parameters can be viewed as further comprising a sample size N ring offsets from the axial centerline of a sample size N drive motors (such as 106) and a sample size N ring offset angles in the direction of the ring offsets.

Additionally, the measured disc stack parameters can further comprise N maximum ring outer diameters (such as 510); N drive motor center points (such as 512); and N clamp angles wherein the clamp angles comprise an orientation of the zero reference marks (such as 503) on the clamps.

The method (such as shown in operational flow 600) of measuring the next disc stack parameters with the optical measurement system (such as 400) can be viewed as comprising capturing an image of the next disc stack (such as 200) with a computer controlled digital camera (such as 406), measuring the disc stack parameters, and transmitting the measured parameters to a computer (such as 404).

Furthermore, calibrating the optical measurement system (such as 400) before measuring the sample size N disc stack parameters can be viewed as comprising: capturing an image of a disc stack component installed on a disc stack (such as 200); referencing a zero mark (such as 503) on the disc stack component from which subsequent angle measurements are clock wise; calibrating the disc stack parameters that are measured in the sample size N; selecting and measuring a disc stack parameter multiple times to calibrate a pixel count of a digital camera (such as 406); comparing apparent measured values of the parameters to actual measured values; and utilizing a scaling factor to convert the apparent values to the actual values.

It will be clear that the present embodiments are well adapted to attain the ends and advantages mentioned as well as those inherent therein. While embodiments have been described for purposes of this disclosure, various changes and modifications may be made which are well within the scope of the embodiments of the present invention. For example, the concept could be extended to the measurement of media and non-symmetrical component offsets with respect to the motor's axis for further drive balance improvement. Numerous other changes may be made which will readily suggest themselves to those skilled in the art and which are encompassed in the spirit of the embodiments disclosed and as defined in the appended claims.

What is claimed is:

1. A method of compensating for imbalance in a data storage disc stack within a data storage device during assembly of the data storage device, the disc stack having components including a drive motor having a stationary stator and a hub that rotates about the stator, the hub having a disc support flange supporting one or more data storage discs secured to the flange by a disc clamp, the method comprising acts of:
  a) optically measuring one or more disc stack parameters, including disc stack component offsets for a sample of disc stacks produced on an assembly line;
  b) calculating a moving average of the sampled parameters;
  c) utilizing the calculated moving average to determine a desired component configuration type; and
  d) feeding back the desired component configuration type to a component installation station to select the desired component configuration type for installation in a disc stack.

2. The method of claim 1, further comprising acts of:
  e) determining whether a next disc stack is to be assembled;
  f) in response to a next disc stack to be assembled, receiving and installing the component configuration type to compensate for imbalance in the next disc stack;
  g) optically measuring the disc stack parameters on the next disc stack; and
  b) repeating acts b) Through d).

3. The method of claim 2, further comprising repeating acts b) Through h) for each subsequent disc stack.

4. The method of claim 2, wherein the sampled parameters comprise disc clamp offsets and disc clamp offset angles wherein the disc clamp offset comprises a radial distance between an axial centerline of the drive motor and a center of the disc clamp and the disc clamp offset angle comprises a disc clamp offset direction measured from a zero reference mark on the disc clamp.

5. The method of claim 4, wherein the disc clamp is installed with a spring expansion ring designed to center the disc clamp wit respect to the axial centerline of the drive motor and the sampled parameters comprise ring offsets and ring offset angles.

6. The method of claim 4, wherein utilizing the calculated averages to determine a desired component configuration type comprises:
  determining whether the moving avenge of the component offset is greater than a predetermined threshold offset;
  in response to the moving average for the component offset being less than or equal to the predetermined threshold offset, selecting an original component configuration type;
  in response to the moving average of the component offset being greater than the predetermined threshold offset, determining whether the moving average of the component offset angle is within a first sector;
  in response to the moving average of the component offset angle being within the first sector, selecting a component configuration type modified to compensate for offset angles located within the first sector;
  in response to the moving average of the component offset angle being outside of the first sector, determining whether the moving avenge angle is within a second sector;
  in response to the moving average angle of the component offset being within the second sector, selecting a component configuration type modified to compensate for offset angles located within the second sector;
  in response to the moving average angle of the component offset being outside the second sector, determining whether the moving average angle is within a third sector;
  in response to the moving average angle of the component offset being within the third sector, selecting a clamp configuration type modified to compensate for offset angles located within the third sector; and
  in response to the moving average angle of the component offset being outside the third sector, utilizing a clamp configuration type modified to compensate for offset angles located within a fourth sector.

7. The method of claim 6, wherein a modified configuration type of the disc clamp comprises an addition or enlargement of one or more compensating notches located at one or more angular locations on the disc clamp.

8. The method of claim 4, further comprising calculating a moving average of a sample of disc stack clamp offset angle deltas, wherein a delta comprises the difference between the clamp offset angle of the next disc stack and the moving average of the offset angles.

9. The method of claim 8, wherein determining a clamp configuration type further comprises:
   determining whether the moving average clamp offset angle delta is equal to or greater than a predetermined maximum delta for stability;
   determining whether the moving avenge for clamp offset is greater than a predetermined maximum offset for stability; and
   in response to the moving avenge clamp offset angle delta being equal to or greater than the predetermined maximum delta or the moving avenge for clamp offset being greater than the predetermined maximum offset, providing an indicator of equipment instability.

10. The method of claim 8, wherein the moving averages are calculated in correlation with a clamp install machine and a clamp supplier.

11. The method of claim 2, wherein receiving and installing the component configuration type comprises receiving, at a disc clamp installation station, a disc clamp configuration type to compensate for imbalance in the next disc stack and installing the disc clamp having the predetermined configuration type over the flange of the next disc stack to secure the at least one disc.

12. The method of claim 2, wherein optically measuring the disc stack parameters on the next disc stack comprises measuring the clamp offset of the next disc stack for use in calculating the moving average.

13. The method of claim 1, wherein the sampled parameters comprise:
   a clamp offset angle;
   a maximum ring outer diameter;
   a drive motor center point; and
   a clamp angle indicating an orientation of a zero reference mark on the respective clamps.

14. The method of claim 1, wherein optically measuring the disc stack parameters is performed with an optical measurement system including the acts of capturing an image of the disc stack with a computer controlled digital camera, measuring the disc stack parameters, and transmitting the measured parameters to a computer.

15. The method of claim 1, further comprising calibrating an optical measurement system before optically measuring the disc stack parameters wherein the calibration procedure comprises:
   capturing an image of a disc stack component installed on a disc stack;
   referencing a zero mark on the disc stack component from which subsequent angle measurements are made;
   calibrating the measured disc stack parameters;
   selecting and measuring a disc stack parameter multiple times to calibrate a pixel count of the computer controlled digital camera;
   comparing one or more apparent measured values of the parameters to one or more actual measured values; and
   utilizing a scaling factor to convert the apparent values to the actual values.

16. A system for providing an optimum disc stack component configuration to compensate for data storage disc stack imbalance during the assembly of a data storage device, the disc stack having components including a drive motor having a stationary stator and a hub tat rotates about the stator, the hub having a disc support flange supporting one or more data storage discs secured to the flange by a disc clamp, to system comprising:
   a digital camera capturing an image of the data storage disc stack, measuring one or more disc stack parameters for each disc stack of a sample of disc stacks, wherein the parameters include a component offset comprising a component offset angle indicating the direction of the component offset, and transmitting the measured parameters to a processing unit;
   to processing unit, in response to receiving the parameters, computing one or more dynamic averages of the disc stack parameters and from the dynamic averages determining an optimum disc stack component configuration type, wherein the dynamic averages include a dynamic average of the component offsets and a dynamic average of the component offset angles for the sample, and the processing unit updating a memory unit and transmitting the optimum disc stack component configuration type for use during a component installation operation on a next disc stack.

17. The system of claim 16, further comprising:
   a bar code reader identifying the disc stack and one or more failure or process statistics associated wit the disc stack;
   a logic controller operating automated equipment to place each disc stack in position for an image to be captured; and
   a display unit to display the optimum component configuration type and the disc stack parameters.

18. A method of providing an optimum disc clamp configuration type to compensate for disc stack imbalance in a data storage device, the disc stack having components including a drive motor having a stationary stator and a hub that rotates about the stator, the hub having a disc support flange supporting one or more data storage discs secured to the flange by a disc clamp, the method comprising:
   measuring one or more data storage disc stack parameters in response to a disc stack reaching an optical measurement zone for a sample of disc stacks, wherein the measured parameters are selected from the group consisting of a clamp offset, a clamp offset angle, a ring diameter; a ring offset a ring offset angle, a motor center point, a ring concentricity with respect to the disc clamp and a clamp angle wherein the angles are measured from a zero reference mark on the clamp;
   utilizing the measured disc stack parameters to compute one or more averages;
   wherein the averages include dynamic moving averages of the sampled parameters from the disc stacks; and
   from the dynamic moving averages, determining an optimum disc clamp configuration type for a subsequent disc stack.

19. The method of claim 18, wherein a modified configuration type of the data storage disc clamp includes an addition or enlargement of one or more compensating notches located at one or more angular locations in the perimeter of the data storage disc clamp and wherein determining the proper clamp configuration type comprises:
   determining whether the dynamic moving average of the clamp offset is greater than a predetermined threshold offset wherein the predetermined threshold offset is of a nominal value;

in response to the dynamic moving average for clamp offset being less than or equal to the predetermined threshold offset providing an original clamp configuration;

in response to the dynamic moving average of the clamp offset being greater than the threshold offset, determining whether the dynamic moving average of the clamp offset angle is within a first quadrant, wherein the first quadrant includes one or more angles from −45 to 45 degrees of a zero reference marking;

in response to the dynamic moving average of the clamp offset angle being within the first quadrant, providing a clamp configuration type modified to compensate for clamp offset angles within the first quadrant;

in response to the dynamic moving average of the clamp angle being outside of the first quadrant, determining whether the dynamic moving avenge of the clamp offset angle is within a second quadrant, wherein the second quadrant includes one or more angles greater than 45 degrees and less than 135 degrees;

in response to the dynamic moving average of the clamp offset angle being within the second quadrant, providing a clamp configuration type modified to compensate for clamp offset angles within the second quadrant;

in response to the dynamic moving average of the clamp offset angle being outside the second quadrant, determining whether the dynamic moving average of the clamp offset angle is within a third quadrant, wherein the third quadrant includes one or more angles from 135 degrees to 225 degrees;

in response to the dynamic moving avenge of the clamp offset angle being within the third quadrant, providing a clamp configuration type modified to compensate. for clamp offset angles within the third quadrant; and in response to the dynamic moving avenge of the clamp offset angle being outside the third quadrant, providing a clamp configuration type modified to compensate for clamp offset angles within a fourth quadrant wherein the fourth quadrant includes one or more angles greater than 225 degrees and less than 315 degrees.

20. A controller for a data storage device assembly line comprising:

a microprocessor; and an optical measurement means for providing an optimum disc stack component configuration type that compensates for imbalance in a data storage disc stack during assembly of the data storage device.

* * * * *